US011979898B2

(12) United States Patent
Tokuyasu et al.

(10) Patent No.: US 11,979,898 B2
(45) Date of Patent: May 7, 2024

(54) WIRELESS COMMUNICATION SYSTEM, WIRELESS COMMUNICATION METHOD, MANAGEMENT STATION DEVICE, BASE STATION DEVICE, AND TERMINAL STATION DEVICE

(71) Applicant: NIPPON TELEGRAPH AND TELEPHONE CORPORATION, Tokyo (JP)

(72) Inventors: Tomohiro Tokuyasu, Musashino (JP); Hiroyuki Furuya, Musashino (JP); Hayato Fukuzono, Musashino (JP); Yu Ono, Musashino (JP); Tsutomu Tatsuta, Musashino (JP); Tomohiro Nakayama, Osaka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 344 days.

(21) Appl. No.: 17/596,160

(22) PCT Filed: May 28, 2020

(86) PCT No.: PCT/JP2020/021044
§ 371 (c)(1),
(2) Date: Dec. 3, 2021

(87) PCT Pub. No.: WO2020/246357
PCT Pub. Date: Dec. 10, 2020

(65) Prior Publication Data
US 2022/0240272 A1 Jul. 28, 2022

(30) Foreign Application Priority Data

Jun. 6, 2019 (JP) ................................ 2019-106082

(51) Int. Cl.
*H04W 72/542* (2023.01)
*H04W 72/23* (2023.01)

(52) U.S. Cl.
CPC ......... *H04W 72/542* (2023.01); *H04W 72/23* (2023.01)

(58) Field of Classification Search
CPC . H04W 72/542; H04W 72/23; H04W 56/006; Y02D 30/70
See application file for complete search history.

(56) References Cited

U.S. PATENT DOCUMENTS

2009/0232113 A1  9/2009  Tamaki
2010/0208720 A1  8/2010  Fujishima et al.

FOREIGN PATENT DOCUMENTS

JP  H6334593 A  12/1994
JP  H10075205 A  3/1998
(Continued)

*Primary Examiner* — Ayanah S George
(74) *Attorney, Agent, or Firm* — Harness, Dickey & Pierce, P.L.C.

(57) ABSTRACT

A wireless communication system includes a plurality of sets of base station devices and terminal station devices configured to perform communications in an equal frame length using a time division duplex scheme, the communications of the plurality of sets being simultaneously operated in adjacent areas, in which each of the base station devices includes a control unit configured to control a transmission timing of a downlink signal transmitted from the base station device itself based on a communication distance between the base station device and the terminal station device of each of the sets or a reception timing of a downlink signal in the terminal station device such that reception timings of downlink signals transmitted from the base station device itself and other base station devices in the terminal station devices of the sets fall within a predetermined range determined in advance.

3 Claims, 9 Drawing Sheets

(56) References Cited

FOREIGN PATENT DOCUMENTS

| | | | |
|---|---|---|---|
| JP | 2001054167 A | | 2/2001 |
| JP | 2009206735 A | * | 9/2009 |
| JP | 2009225137 A | | 10/2009 |
| JP | 2017076927 A | * | 4/2017 |
| WO | WO-2009048094 A1 | | 4/2009 |

* cited by examiner

WIRELESS COMMUNICATION SYSTEM, WIRELESS COMMUNICATION METHOD, MANAGEMENT STATION DEVICE, BASE STATION DEVICE, AND TERMINAL STATION DEVICE

CROSS-REFERENCE TO RELATED APPLICATIONS

This application is a 371 U.S. National Phase of International Application No. PCT/JP2020/021044 filed on May 28, 2020, which claims priority to Japanese Patent Application No. 2019-106082, filed on Jun. 6, 2019. The entire disclosure of the above applications are incorporated herein by reference.

TECHNICAL FIELD

The present invention relates to a technology for avoiding inter-channel interference in a wireless communication system using a time division duplex scheme.

BACKGROUND ART

In an environment in which a plurality of wireless communication systems using a time division duplex (TDD) scheme as a duplex scheme is operated, there is a need for a technology for avoiding inter-channel interference. Here, in the related art, there is almost no wireless communication system employing a time division duplex scheme in a long-range wireless communication, and in most cases, synchronization among base stations is performed in a wireless communication system in a short-range wireless communication. Moreover, there is used a technology in which in a wireless communication system with a short communication distance, synchronization among base stations is realized with high accuracy to enable site diversity (for example, see Patent Literature 1). Alternatively, there is used a technology in which communication time is separated to be temporally isolated such that communications among base stations do not interference with each other (for example, see Patent Literature 2).

CITATION LIST

Patent Literature

Patent Literature 1: JP 2009-206735 A
Patent Literature 2: JP 2001-054167 A

SUMMARY OF THE INVENTION

Technical Problem

In the related art, in a wireless communication system that enables a long-range communication at a low frequency such as a very high frequency (VHF) band, there is a problem in which even if transmission timings are synchronized with high accuracy among base stations, when a difference in communication distance is large, a large shift occurs in reception timings in terminal stations to generate inter-channel interference.

FIG. 8 illustrates an example of a wireless communication system 700 in the related art. The wireless communication system 700 includes: a system 750(1) of a base station 801(1) and a terminal station 802(1) configured to perform communication with each other using a wireless channel 803(1); and a system 750(2) of a base station 801(2) and a terminal station 802(2) configured to perform communication with each other using a wireless channel 803(2), and performs a communication using a time division duplex scheme. Here, in the wireless communication system 700, each of the system 750(1) and the system 750(2) is one set and communications of the plurality of sets are operated simultaneously in adjacent areas. A communication distance between the base station 801(2) and the terminal station 802(2) is assumed to be shorter than a communication distance between the base station 801(1) and the terminal station 802(1). In this case, for downlink signals transmitted at the same timing from the base station 801(1) and the base station 801(2), a reception timing of the downlink signal of the base station 801(1) in the terminal station 802(1) is later than a reception timing of the downlink signal of the base station 801(2) in the terminal station 802(2) due to the difference in communication distance. The terminal station 802(1) and the terminal station 802(2) transmit uplink signals after a guard time (referred to as a GT) of a predetermined period of time determined in advance from the reception of the downlink signals. In a case where an installation distance between the terminal station 802(1) and the terminal station 802(2) is short, however, when the terminal station 802(2) transmits an uplink signal while the terminal station 802(1) receives a downlink signal from the base station 801(1), a problem occurs in which the uplink signal of the terminal station 802(2) affects the reception of the terminal station 802(1) as an interference wave. Note that, even if the wireless channel 803(1) and the wireless channel 803(2) are different from each other, when the terminal station 802(1) and the terminal station 802(2) are close in distance, the downlink signal coming from the distal base station 801(1) to the terminal station 802(1) is affected.

FIG. 9 illustrates an example of a timing in the wireless communication system 700 in the related art. FIG. 9(a) illustrates a case where the GT is of 2 slots, and FIG. 9(b) illustrates a case where the GT is of 3 slots. Note that a frame length is fixed. In FIG. 9(a), the base station 801(1) and the base station 801(2) each transmit a downlink signal of 10 slots having a control slot including a synchronization signal, traffic information, and the like as a leading slot, and the terminal station 802(1) and the terminal station 802(2) each transmit an uplink signal including data slots of 10 slots after an interval of the GT of 2 slots after receiving the downlink signal. Here, the communication distance between the base station 801(2) and the terminal station 802(2) is shorter than the communication distance between the base station 801(1) and the terminal station 802(1), and thus the downlink signal of the base station 801(2) is received by the terminal station 802(2) with a delay of one slot. On the other hand, the downlink signal of the base station 801(1) is received by the terminal station 802(1) with a delay of 4 slots. As a result, the leading one slot of the uplink signal transmitted by the terminal station 802(2) to the base station 801(2) overlaps the last one slot of the downlink signal received by the terminal station 802(1). In particular, as described in FIG. 8, in a case where the terminal station 802(1) and the terminal station 802(2) are close to each other in distance, the last slot of the downlink signal received by the terminal station 802(1) from the base station 801(1) is subjected to interference by the leading slot of the uplink signal transmitted by the terminal station 802(2). In the related art, as illustrated in FIG. 9(b), the GT between reception of the downlink signal and transmission of the uplink signal by the terminal station 802(1) and the terminal station 802(2) is increased to 3 slots, so that the leading slot of the uplink signal of the terminal station 802(2) does not overlap with the last slot of the downlink signal of the terminal station 802(1).

As described above, in the related art, the problem occurs in which although it is necessary to increase the GT added to a communication frame to avoid interference, when the frame length is fixed, the number of data slots decreases, an amount of communicable data for a unit time (per frame) decreases, and a frequency utilization efficiency decreases.

The present invention is directed to providing a wireless communication system, a wireless communication method, a management station device, a base station device, and a terminal station device, in which without generating inter-channel interference among terminal station devices each performing a communication using a time division duplex scheme, it is possible to shorten a guard time from reception end of a downlink signal to transmission start of an uplink signal in each terminal station device to improve a frequency utilization efficiency.

Means for Solving the Problem

A first aspect of the present invention is a wireless communication system including a plurality of sets of base station devices and terminal station devices configured to perform communications in an equal frame length using a time division duplex scheme, the communications of the plurality of sets being operated simultaneously in adjacent areas, in which each of the base station devices includes a control unit configured to control a transmission timing of a downlink signal transmitted from the base station device itself based on a communication distance between the base station device and the terminal station device of each of the sets or a reception timing of a downlink signal in the terminal station device such that reception timings of downlink signals transmitted from the base station device itself and other base station devices in the terminal station devices of the sets fall within a predetermined range determined in advance.

A second aspect of the present invention is a wireless communication method in which a plurality of sets of base station devices and terminal station devices configured to perform communication in an equal frame length using a time division duplex scheme are present and communications of the plurality of sets are operated simultaneously in adjacent areas, the wireless communication method including controlling a transmission timing of a downlink signal transmitted from each of the base station devices based on a communication distance between the base station device and the terminal station device of each of the sets or a reception timing of a downlink signal in the terminal station device, such that reception timings of downlink signals transmitted from the base station devices in the terminal station devices of the sets fall within a predetermined range determined in advance.

A third aspect of the present invention is a management station device configured to control a transmission timing of a downlink signal to be transmitted by a base station device to a terminal station device in a wireless communication system in which a plurality of sets of base station devices and terminal station devices configured to perform communications in an equal frame length using a time division duplex scheme are present and communications of the plurality of sets are simultaneously operated in adjacent areas, the management station device including: a management unit configured to store information on communication distances between the base station devices and the terminal station devices of the sets; and a control unit configured to control a transmission timing of a downlink signal transmitted from each of the base station devices based on each of the communication distances between the base station devices and the terminal station devices of the sets, such that reception timings of downlink signals transmitted from the base station devices in the terminal station devices of the sets fall within a predetermined range determined in advance.

A fourth aspect of the present invention is a base station device configured to form a set with a terminal station device that performs a communication with the base station device in an equal frame length using a time division duplex scheme and control a transmission timing of a downlink signal transmitted to the terminal station device, the base station device including: a transceiver unit configured to transmit a downlink signal to the terminal station device that forms the set with the base station and receive an uplink signal from the terminal station device; a control unit configured to control a transmission timing of a downlink signal transmitted from the transceiver unit to the terminal station device based on information received from the terminal station device; and a detection result receiving unit configured to receive, from the terminal station device of the same set, detection result information related to a downlink signal transmitted by the base station device of the same set and a downlink signal transmitted by the base station device of a different set.

A fifth aspect of the present invention is a terminal station device configured to form a set with a base station device that performs a communication in an equal frame length using a time division duplex scheme and detect a reception timing of a downlink signal transmitted from the base station device, the terminal station device including: a detection unit configured to detect a downlink signal transmitted from the base station device; and a notification unit configured to notify the base station device that forms the set with the terminal station device of detection result information of a downlink signal detected by the detection unit.

Effects of the Invention

The wireless communication system, the wireless communication method, the management station device, the base station device, and the terminal station device according to the present invention can shorten a guard time from reception end of a downlink signal to transmission start of an uplink signal in each terminal station device to improve a frequency utilization efficiency without generating inter-channel interference between terminal station devices each performing a communication using a time division duplex scheme.

DESCRIPTION OF EMBODIMENTS

Hereinafter, embodiments of a wireless communication system, a wireless communication method, a management station device, a base station device, and a terminal station device according to the present invention will be described with reference to the drawings.

First Embodiment

Figure 1:
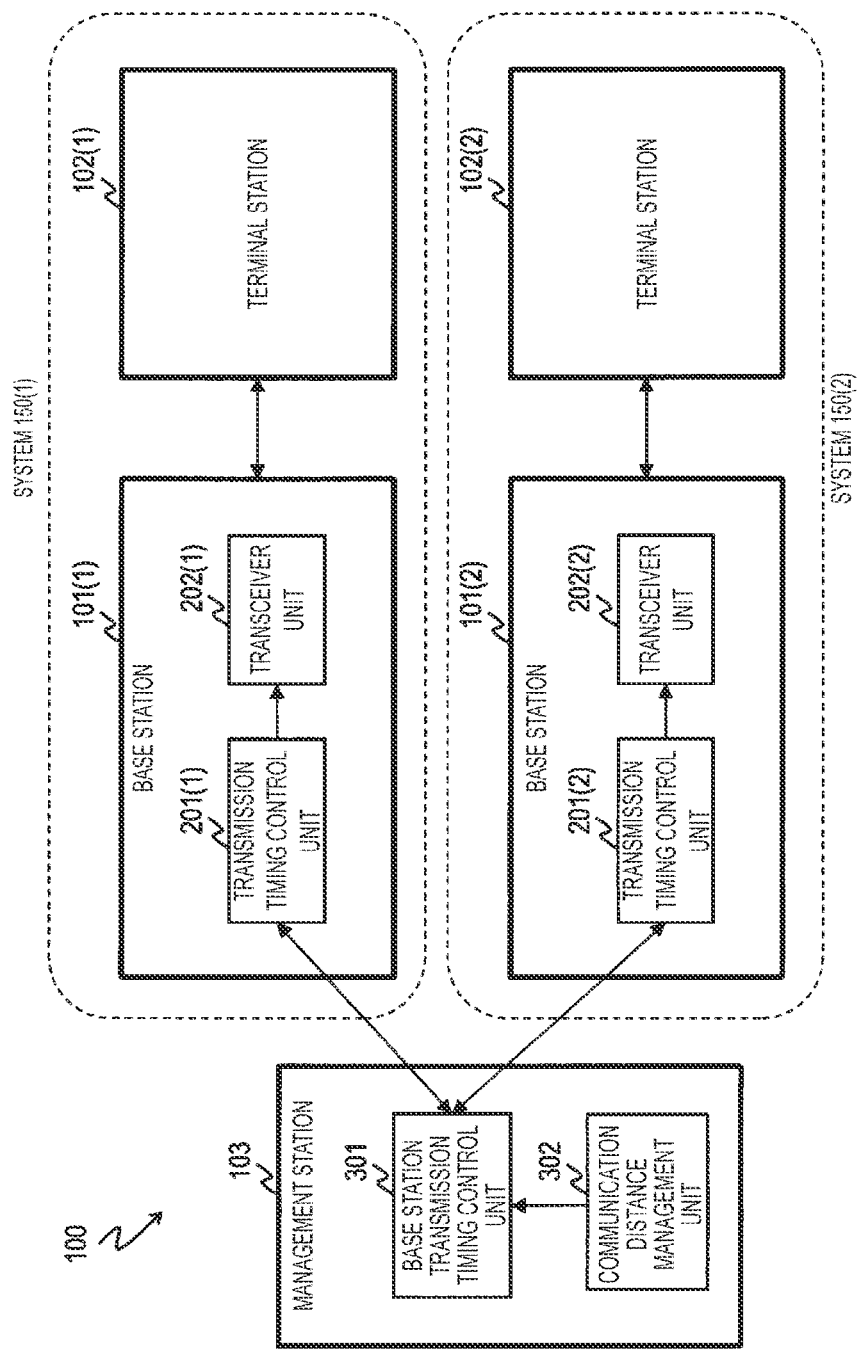
FIG. 1 is a diagram illustrating an example of a wireless communication system according to a first embodiment.

FIG. 1 is a diagram illustrating an example of a wireless communication system 100 according to a first embodiment. In FIG. 1, the wireless communication system 100 includes a base station 101(1), a base station 101(2), a terminal station 102(1), a terminal station 102(2), and a management station 103. The base station 101(1) and the terminal station 102(1) constitute a system 150(1) as one set, the base station 101(2) and the terminal station 102(2) constitute a system 150(2) as another set using a wireless channel different from that of the system 150(1), and each of the sets performs a communication using a time division duplex scheme. Here, in the wireless communication system 100, a plurality of sets, that is, the system 150(1) and the system 150(2), are present and communications of the plurality of sets are operated simultaneously in adjacent areas, and the communications of the plurality of sets are subjected to interference with each other. Note that, in FIG. 1, similarly to FIG. 8 of the related art, a plurality of similar devices each are described by adding (number) to an end of a reference sign. For example, in FIG. 1, there are two base stations 101, and thus when individual base stations 101 are specified, description is made by adding (number) to the end of the reference numeral, such as a base station 101(1) and a base station 101(2), and when description is common to the individual base stations, (number) of the end of the reference sign is omitted to make description as the base station 101. The same applies to the terminal station 102(1) and the terminal station 102(2). Furthermore, the same applies to a plurality of similar blocks constituting the base station 101 and the terminal station 102, and the same applies to other embodiments described later.

Note that although in the present embodiment and the other embodiments, the wireless communication system 100 having two systems, that is, the system 150(1) and the system 150(2) which use different wireless channels, will be described, the present embodiment and the other embodiments are similarly applicable to a wireless communication system having three or more sets of systems.

In FIG. 1, the base station 101 includes a transmission timing control unit 201 and a transceiver unit 202. Note that in FIG. 1, a general processing block other than control of a timing at which the base station 101 transmits a downlink signal to the terminal station 102 (e.g., processing for connecting the terminal station 102 to a server on a network, and the like) is omitted.

The transmission timing control unit 201 controls a transmission timing of a downlink signal transmitted from the transceiver unit 202 to the terminal station 102. Specifically, the transmission timing control unit 201 instructs the transceiver unit 202 to transmit a downlink signal, and the transceiver unit 202 transmits the downlink signal using the timing at which the transmission instruction is received as a transmission timing. Note that the transmission timing is given by the management station 103 described later.

The transceiver unit 202 performs a wireless communication with the terminal station 102 using a preset wireless channel. In particular, in the present embodiment, the transceiver unit 202 transmits the downlink signal to the terminal station 102 at the transmission timing specified by the transmission timing control unit 201. The transceiver unit 202 receives an uplink signal transmitted from the terminal station 102.

In FIG. 1, the terminal station 102 has a general function of performing a wireless communication with the base station 101. For example, the terminal station 102 forms a wireless channel of a time division duplex scheme (TDD) between the terminal station 102 and the base station 101, receives a downlink signal transmitted from the base station 101, and transmits an uplink signal after a predetermined GT. In this manner, the terminal station 102 can perform a data communication with a server on a higher network, for example, via the base station 101.

In FIG. 1, the management station 103 includes a base station transmission timing control unit 301 and a communication distance management unit 302. Note that in FIG. 1, a general processing block for operating as the management station 103 (e.g., an interface to an operator, monitoring processing of the entire wireless communication system 100, and the like) is omitted.

In order that reception timings of downlink signals transmitted from a plurality of base stations 101 in the respective terminal stations 102 may fall within a predetermined range determined in advance, the base station transmission timing control unit 301 controls timings at which each of the base stations 101 transmits a downlink signal to the corresponding terminal station 102. As described later, the control of the timing at which the downlink signal is transmitted is performed based on a communication distance for each of sets of the base stations 101 and the terminal stations 102 managed by the communication distance management unit 302. For example, the base station transmission timing control unit 301 instructs the transmission timing control unit 201(1) on a timing (1) at which the base station 101(1) of the system 150(1) transmits a downlink signal to the terminal station 102(1). In addition, the base station transmission timing control unit 301 instructs the transmission timing control unit 201(2) on a timing (2) at which the base station 101(2) of the system 150(2) transmits a downlink signal to the terminal station 102(2). A method for controlling the transmission timing in accordance with the communication distance will be described in detail later.

The communication distance management unit 302 manages information on a communication distance between the base station 101 and the terminal station 102 which forms a set with the base station 101. For example, information on the communication distance between the base station 101 and the terminal station 102 is input by an operator into the communication distance management unit 302, and the input information on the communication distance is stored in a storage medium such as a memory of the communication distance management unit 302. Note that, in the present embodiment, both the base station 101 and the terminal station 102 are fixed stations installed on land, and perform fixed land communications. The communication distance between the base station 101 and the terminal station 102 which form a set is thus fixed, and the operator can know the information on the communication distance in advance from a system design content (latitude/longitude positional information and the like). In particular, in the present embodiment, the management station 103 can integrally manage information on communication distances between a plurality of base stations 101 and corresponding terminal stations 102 which form sets, and thus it is not necessary for the individual base stations 101 and the individual terminal stations 102 to manage the information on the communication distances.

Figure 2:
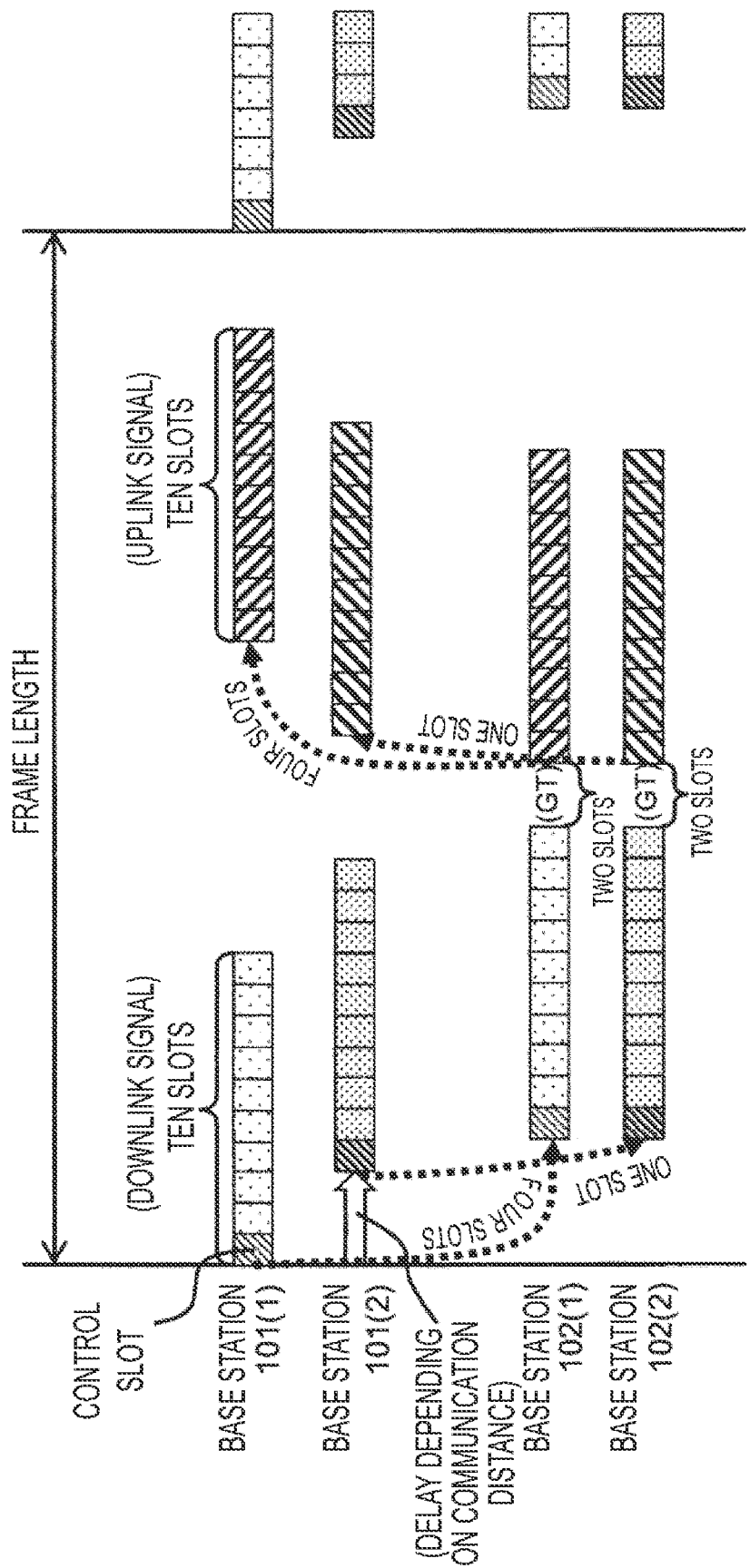
FIG. 2 is a diagram illustrating an example of timing adjustment in the wireless communication system according to the first embodiment.

FIG. 2 is a diagram illustrating an example of timing adjustment in the wireless communication system 100 according to the first embodiment. Note that FIG. 2 is a diagram corresponding to FIG. 9 which has been described in the related art, and illustrates an uplink signal and a downlink signal in a fixed frame length. In FIG. 2, similarly to FIG. 9, the downlink signal has 10 slots having a control slot including a synchronization signal, traffic information, and the like, as a leading slot and the uplink signal has 10 slots all of which are data slots.

Figure 8:
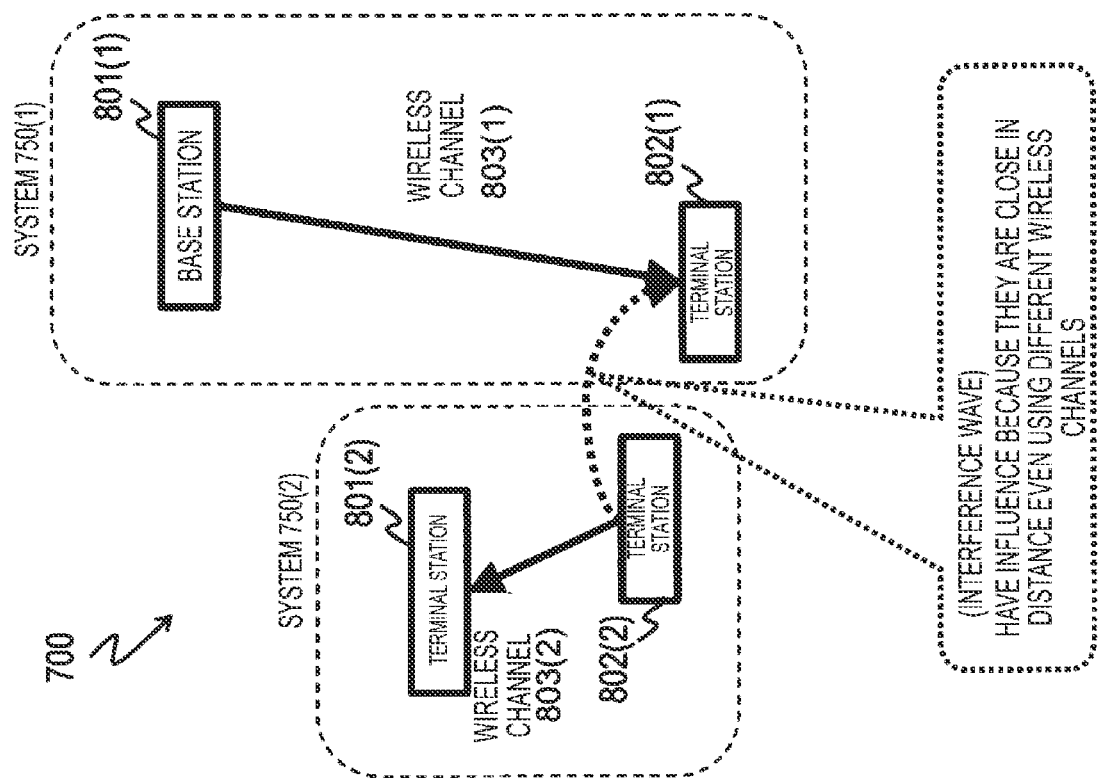
FIG. 8 is a diagram illustrating a problem of a wireless communication system in the related art.

Here, in FIG. 2, it is assumed that a relationship between a communication distance between the base station 101(1) and the terminal station 102(1) and a communication distance between the base station 101(2) and the terminal station 102(2) is the same as the relationship between the communication distance between the base station 801(1) and the terminal station 802(1) and the communication distance between the base station 801(2) and the terminal station 802(2) in FIG. 8 described in the related art. The communication distance between the base station 101(2) and the terminal station 102(2) is thus shorter than the communication distance between the base station 101(1) and the terminal station 102(1). Due to this, as described in FIG. 9(a) of the related art, the downlink signal transmitted by the base station 101(1) is received in the terminal station 102(1) with a delay of 4 slots, and the downlink signal transmitted by the base station 101(2) is received in the terminal station 102(2) with a delay of one slot.

The communication distance management unit 302 of the management station 103 holds information on a communication distance (1) between the base station 101(1) and the terminal station 102(1) which constitute the system 150(1), and a communication distance (2) between the base station 101(2) and the terminal station 102(2) which constitute the system 150(2). As a result, the management station 103 can calculate a time difference between a time required for a transmission signal of the base station 101(1) to be received in the terminal station 102(1) and a time required for a transmission signal of the base station 101(2) to be received in the terminal station 102(2).

Then, as illustrated in FIG. 2, the management station 103 delays the transmission timing of the downlink signal transmitted by the base station 101(2) with the shorter communication distance by a time difference calculated in accordance with the communication distance. In this way, the management station 103 can make the timing at which the terminal station 102 (1) receives the downlink signal transmitted by the base station 101(1) with the longer communication distance and the timing at which the terminal station 102(2) receives the downlink signal transmitted by the base station 101(2) with the shorter communication distance coincide with each other. In this way, in the wireless communication system 100 according to the present embodiment, as illustrated in FIG. 2, the uplink signal of the terminal station 102(2) does not affect the downlink signal of the terminal station 102(1) even when the GT is of 2 slots, thereby eliminating the problem like that in FIG. 9(a) of the related art.

Calculation Example of Transmission Timing Adjustment Amount

For example, it is assumed that a communication distance difference between the system 150(1) with a long communication distance and the system 150(2) with a short communication distance is 60 km ($6\times10^4$ m). When this is converted into a time, as shown in Equation (1), a time difference between a time required for the transmission signal of the base station 101(1) to be received in the terminal station 102(1) and a time required for the transmission signal of the base station 101(2) to be received in the terminal station 102(2) is 200 μsec.

$$6\times10^4/3\times10^8=2\times10^{-4} \tag{1}$$

Here, the light velocity is assumed to be $3\times10^8$ m/sec.

In the system 150(2) with a short communication distance, when the transmission timing of the base station 101(2) is delayed by 200 μsec, the reception timing of the downlink signal in the terminal station 102(1) of the system 150(1) and the reception timing of the downlink signal in the terminal station 102(2) of the system 150(2) coincide with each other, which make it possible to reduce the GT. Note that in practice, timing adjustment is performed in slots and thus it is difficult to make the reception timings in the terminal stations 102 coincide with each other exactly, so that a substantially identical timing within a range of at most one slot is made.

Second Embodiment

Figure 3:
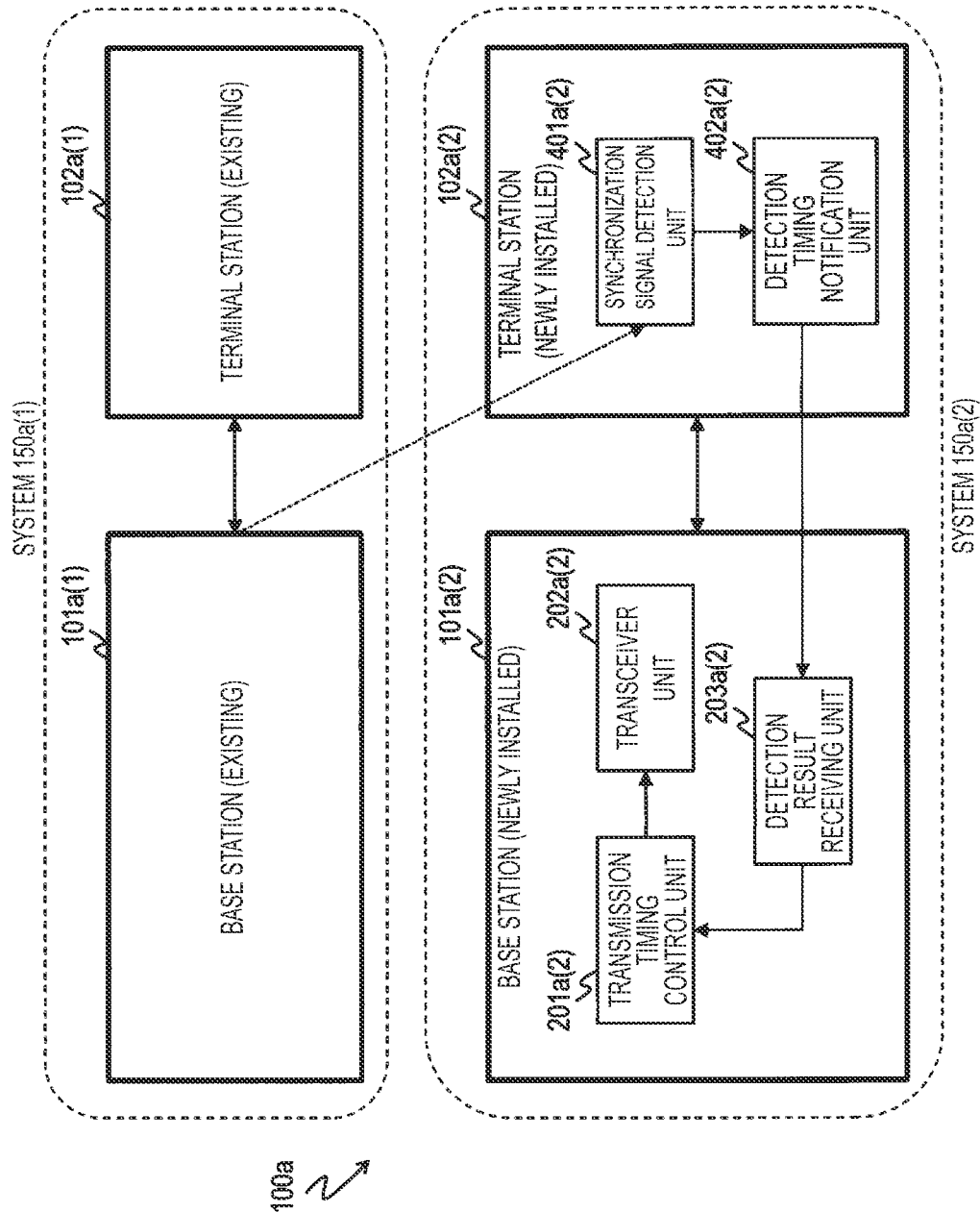
FIG. 3 is a diagram illustrating an example of a wireless communication system according to a second embodiment.

FIG. 3 illustrates an example of a wireless communication system 100a according to a second embodiment. In FIG. 3, the wireless communication system 100a includes a base station 101a(1), a base station 101a(2), a terminal station 102a(1), and a terminal station 102a(2). Then, the base station 101a(1) and the terminal station 102a(1) constitute a system 150a(1) as one set, the base station 101a(2) and the terminal station 102a(2) constitute a system 150a(2) as another set using a wireless channel different from that of the system 150a(1), and each set performs a communication using a time division duplex scheme. Note that, similarly to the first embodiment, the wireless communication system 100a includes a plurality of sets, that is, the system 150a(1) and the system 150a(2), communications of the plurality of sets are operated simultaneously in adjacent areas, and the communications of the plurality of sets are subjected to interference with each other.

Here, difference from the wireless communication system 100 according to the first embodiment is that there is no management station 103. In the present embodiment, instead of the management station 103 controlling synchronization between the base stations 101, a newly installed base station 101a(2) and a newly installed terminal station 102a(2) which constitute a newly installed system 150a(2) control synchronization between the base station 101a(2) and the terminal station 102a(2) and an existing base station 101a(1) and an existing terminal station 102a(1) which constitute an existing system 150a(1). Note that, while in the first embodiment, both the base station 101 and the terminal station 102 are fixed stations installed on land and perform fixed land communications, the present embodiment is also applicable to a case where the communication distance between the base station 101 and the terminal station 102 which form a set is not fixed.

In FIG. 3, the existing base station 101*a*(1) and the existing terminal station 102*a*(1) have the same functions as those of the base station 801 and the terminal station 802 described in the related art in which a transmission timing is not controlled, but the existing base station 101*a*(1) and the existing terminal station 102*a*(1) may have the same functions as those of the newly installed base station 101*a*(2) and the newly installed terminal station 102*a*(2).

First, the newly installed terminal station 102*a*(2) will be described. The newly installed terminal station 102*a*(2) has a synchronization signal detection unit 401*a*(2) and a detection timing notification unit 402*a*(2).

The synchronization signal detection unit 401*a*(2) detects a control slot of a downlink signal transmitted from the newly installed base station 101*a*(2) of the same system 150*a*(2) and a control slot of a downlink signal transmitted from the existing base station 101*a*(1) of the other system 150*a*(1) using a different wireless channel, and outputs detection timings of the control slots as detection result information to the detection timing notification unit 402*a*(2). Here, a detection timing of a control slot is exactly a detection timing of a synchronization signal of the control slot and is the time at which the synchronization signal is detected, but is referred to as the detection timing of the control slot in the following description. Note that the synchronization signal detection unit 401*a*(2) may calculate a magnitude of a shift (time difference, etc.) between the detection timing of the control slot of the newly installed base station 101*a*(2) and the detection timing of the control slot of the existing base station 101*a*(1) and output the magnitude as detection result information to the detection timing notification unit 402*a*(2).

The detection timing notification unit 402*a*(2) notifies the newly installed base station 101*a*(2) of the detection result information output from the synchronization signal detection unit 401*a*(2).

In FIG. 3, the newly installed base station 101*a*(2) includes a transmission timing control unit 201*a*(2), a transceiver unit 202*a*(2), and a detection result receiving unit 203*a*(2). Note that in FIG. 3, it is assumed that a communication is performed between the existing base station 101*a*(1) and the existing terminal station 102*a*(1) which constitute the system 150*a*(1) independently of a communication between the newly installed base station 101*a*(2) and the newly installed terminal station 102*a*(2) which constitute the system 150*a*(2). Furthermore, in FIG. 3, similarly to the case in FIG. 1, a general processing block other than control of the timing at which the base station 101*a* transmits the downlink signal to the terminal station 102*a* is omitted.

The transmission timing control unit 201*a*(2) controls a timing at which a downlink signal is transmitted to the terminal station 102*a*(2) so that reception timings of downlink signals transmitted from the plurality of base stations, that is, the base station 101*a*(1) and the base station 101*a*(2) in the terminal station 102*a*(1) and the terminal station 102*a*(2) fall within a predetermined range determined in advance, and instructs the transceiver unit 202*a*(2) to transmit the downlink signal. Here, while in the first embodiment, the transmission timing at which the base station 101 of each set transmits a downlink signal to the terminal station 102 is controlled based on the communication distance between the base station 101 and the terminal station 102, in the present embodiment, the transmission timing is controlled based on detection result information described later. In addition, while in the first embodiment, the transmission timing is given to each base station 101 by the management station 103, in the present embodiment, the base station 101*a*(2) itself controls the transmission timing of the downlink signal.

The transceiver unit 202*a*(2) operates similarly to the transceiver unit 202(2) described in the first embodiment, and performs a wireless communication with the terminal station 102*a*(2) using a preset wireless channel.

The detection result receiving unit 203*a*(2) receives detection result information from the terminal station 102*a*(2) which forms a set together with the base station 101*a*(2). Here, as described above, the detection result information is information on the time at which the control slot is detected, information on the magnitude of the shift between the detection timing of the control slot of the newly installed base station 101*a*(2) and the detection timing of the control slot of the existing base station 101*a*(1) (time difference and the like), or the like.

Method for Controlling Transmission Timing in Second Embodiment

In the present embodiment, the transmission timing control unit 201*a*(2) controls the transmission timing based on the detection result information received from the terminal station 102*a*(2). For example, in a case where the detection result information is information on the times at which the respective control slots of the base station 101*a*(1) and the base station 101*a*(2) are detected, the transmission timing control unit 201*a*(2) calculates a time difference between the detection time of the control slot of the newly installed base station 101*a*(2) and the detection time of the control slot of the existing base station 101*a*(1) and delays the transmission timing of the downlink signal transmitted from the newly installed base station 101*a*(2) to the newly installed terminal station 102*a*(2) by the time difference.

In a case where the detection result information is information on a time difference between the detection time of the control slot of the newly installed base station 101*a*(2) and the detection time of the control slot of the existing base station 101*a*(1), the transmission timing control unit 201*a*(2) uses the time difference as it is to delay the transmission timing of the downlink signal transmitted from the newly installed base station 101*a*(2) to the newly installed terminal station 102*a*(2).

In this manner, the transmission timing control unit 201*a*(2) can make the timing at which the terminal station 102*a*(1) receives the downlink signal from the base station 101*a*(1) and the timing at which the terminal station 102*a*(2) receives the downlink signal from the base station 101*a*(2) coincide with each other.

Here, in the present embodiment, it is assumed that the communication distance between the newly installed base station 101*a*(2) and the newly installed terminal station 102*a*(2) is shorter than the communication distance between the existing base station 101*a*(1) and the existing terminal station 102*a*(1).

Figure 4:
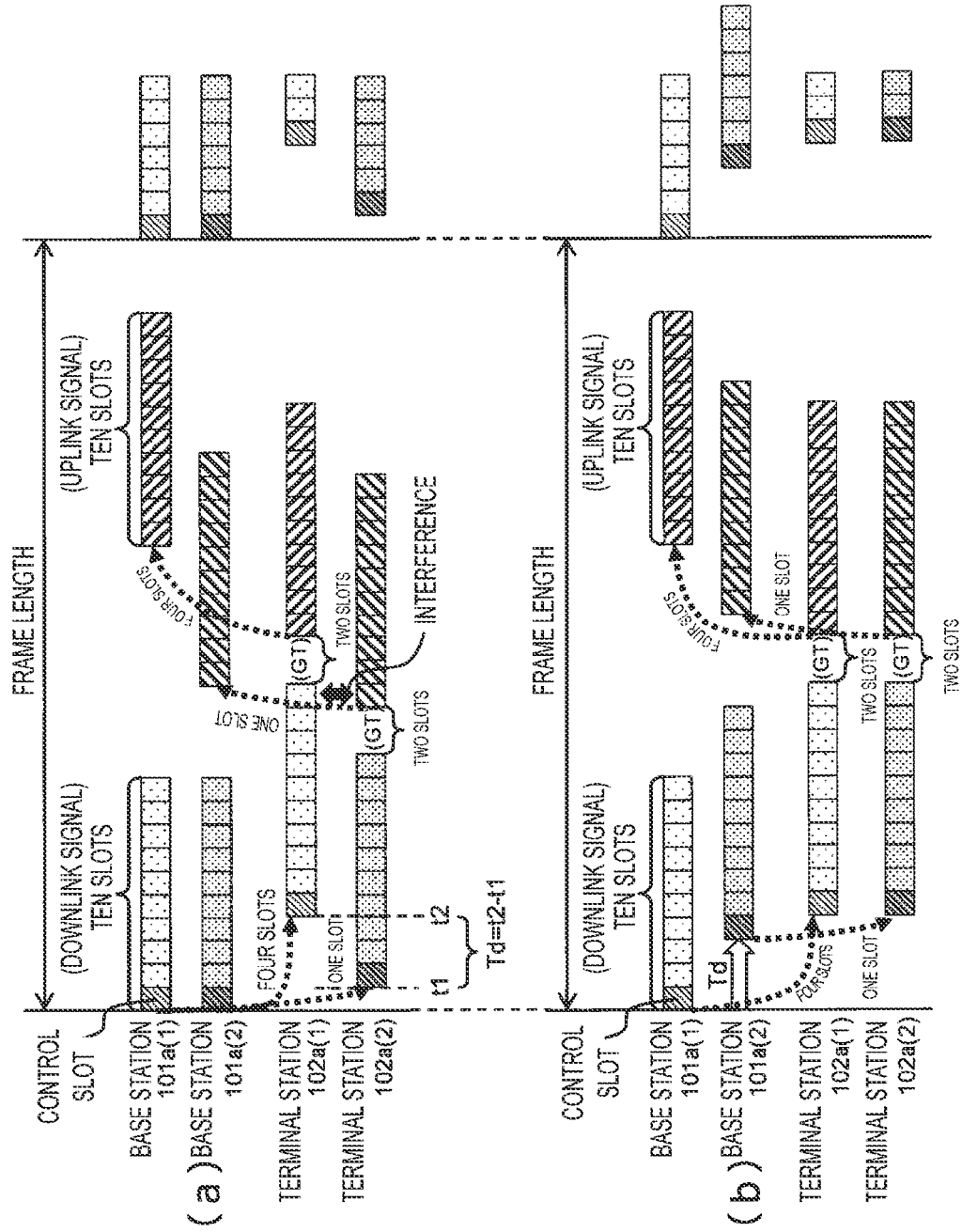
FIG. 4 is a diagram illustrating an example of timing adjustment in the wireless communication system according to the second embodiment.

FIG. 4 illustrates an example of timing adjustment in the wireless communication system 100*a* according to the second embodiment. Note that FIG. 4 is a diagram corresponding to FIG. 9 described in the related art, and illustrates an uplink signal and a downlink signal in a fixed frame length. Here, in FIG. 4, it is assumed that a relationship between a communication distance between the base station 101*a*(1) and the terminal station 102*a*(1) and a communication distance between the base station 101*a*(2) and the terminal station 102*a*(2) is the same as the relationship between the communication distance between the base station 801(1) and the terminal station 802(1) and the communication distance between the base station 801(2) and the terminal station 802(2) in FIG. 8 describe in the related art. The communication distance between the base station 101*a*(2) and the terminal station 102*a*(2) is thus shorter than the communication distance between the base station 101*a*(1) and the terminal station 102*a*(1). Due to this, as described in FIG. 9(*a*) of the related art, the downlink signal transmitted by the base station 101*a*(1) is received in the terminal station 102*a*(1) with a delay of 4 slots, and the downlink signal transmitted by the base station 101*a*(2) is received in the terminal station 102*a*(2) with a delay of one slot.

In FIG. 4(*a*), the synchronization signal detection unit 401*a*(2) of the terminal station 102*a*(2) acquires a detection time t2 of the control slot of the downlink signal transmitted by the base station 101*a*(1) to the terminal station 102*a*(1) and a detection time t1 of the control slot of the downlink signal transmitted by the base station 101*a*(2) to the terminal station 102*a*(2). The synchronization signal detection unit 401*a*(2) of the terminal station 102*a*(2) (or the transmission timing control unit 201*a*(2) of the base station 101*a*(2)) calculates the time difference between the detection time t1 of the control slot of the newly installed base station 101*a*(2) and the detection time t2 of the control slot of the existing base station 101*a*(1), Td=t2−t1.

The transmission timing control unit 201*a*(2) then delays the transmission timing of the downlink signal transmitted from the newly installed base station 101*a*(2) to the newly installed terminal station 102*a*(2) by the time difference Td. As a result, as illustrated in FIG. 4(*b*), the transmission timing control unit 201*a*(2) can make the timing at which the terminal station 102*a*(1) receives the downlink signal from the base station 101*a*(1) and the timing at which the terminal station 102*a*(2) receives the downlink signal from the base station 101*a*(2) coincide with each other. Note that in the present embodiment, the installation distance between the terminal station 102*a*(1) and the terminal station 102*a*(2) is sufficiently short compared to the distance between the base station 101*a*(1) and the base station 101*a*(2) and it is thus considered that the reception timing of the downlink signal of the base station 101*a*(1) detected by the terminal station 102*a*(2) is the same as the reception timing of the downlink signal of the base station 101*a*(1) in the terminal station 102*a*(1).

Figure 9:
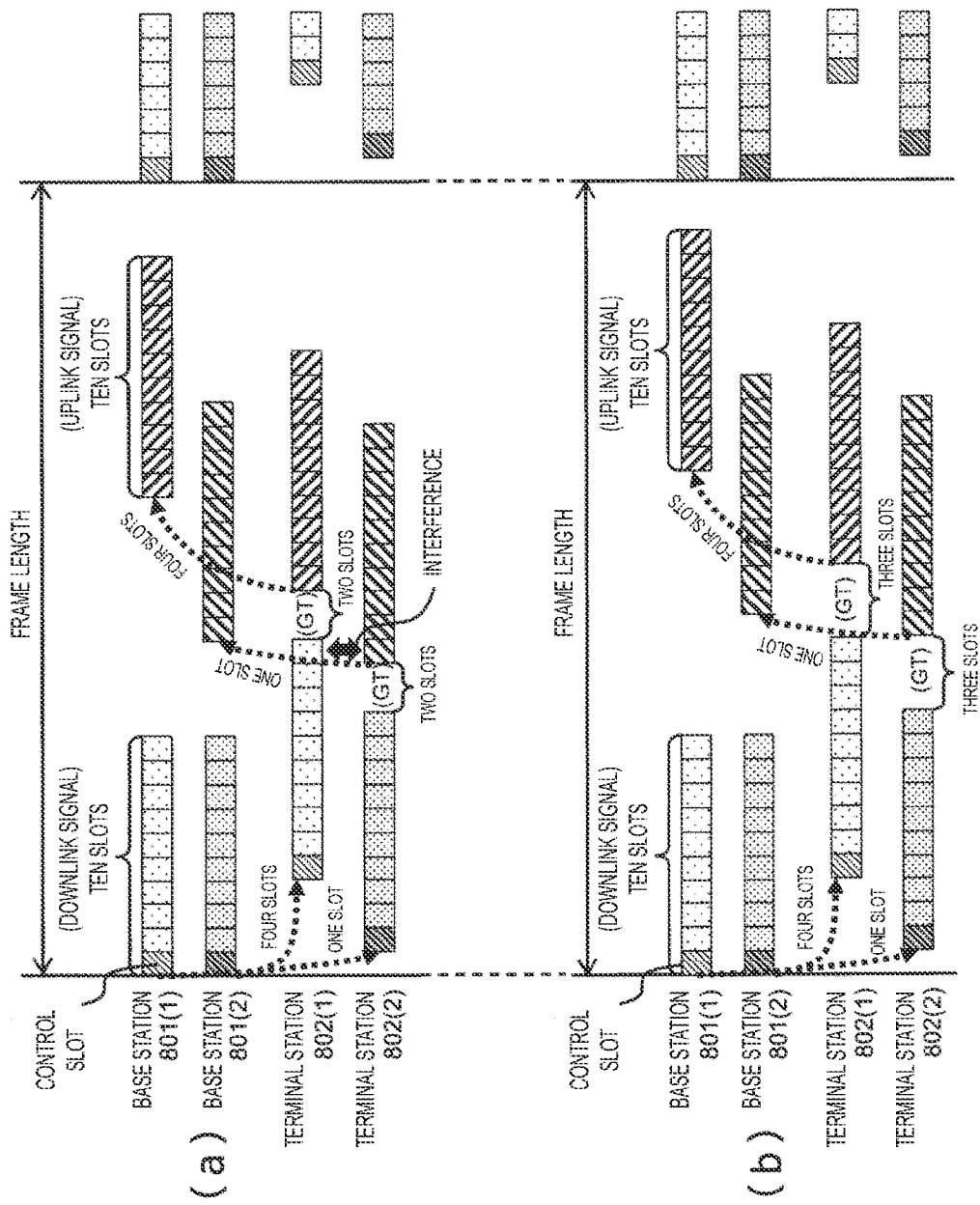
FIG. 9 is a diagram illustrating an example of timing adjustment in the wireless communication system in the related art.

In this manner, in the wireless communication system 100*a* according to the present embodiment, even when the GT is of two slots, the uplink signals of the terminal station 102*a*(1) and the terminal station 102*a*(2) do not affect the downlink signal as illustrated in FIG. 4, thereby eliminating the problem as in FIG. 9(*a*) of the related art.

Third Embodiment

Figure 5:
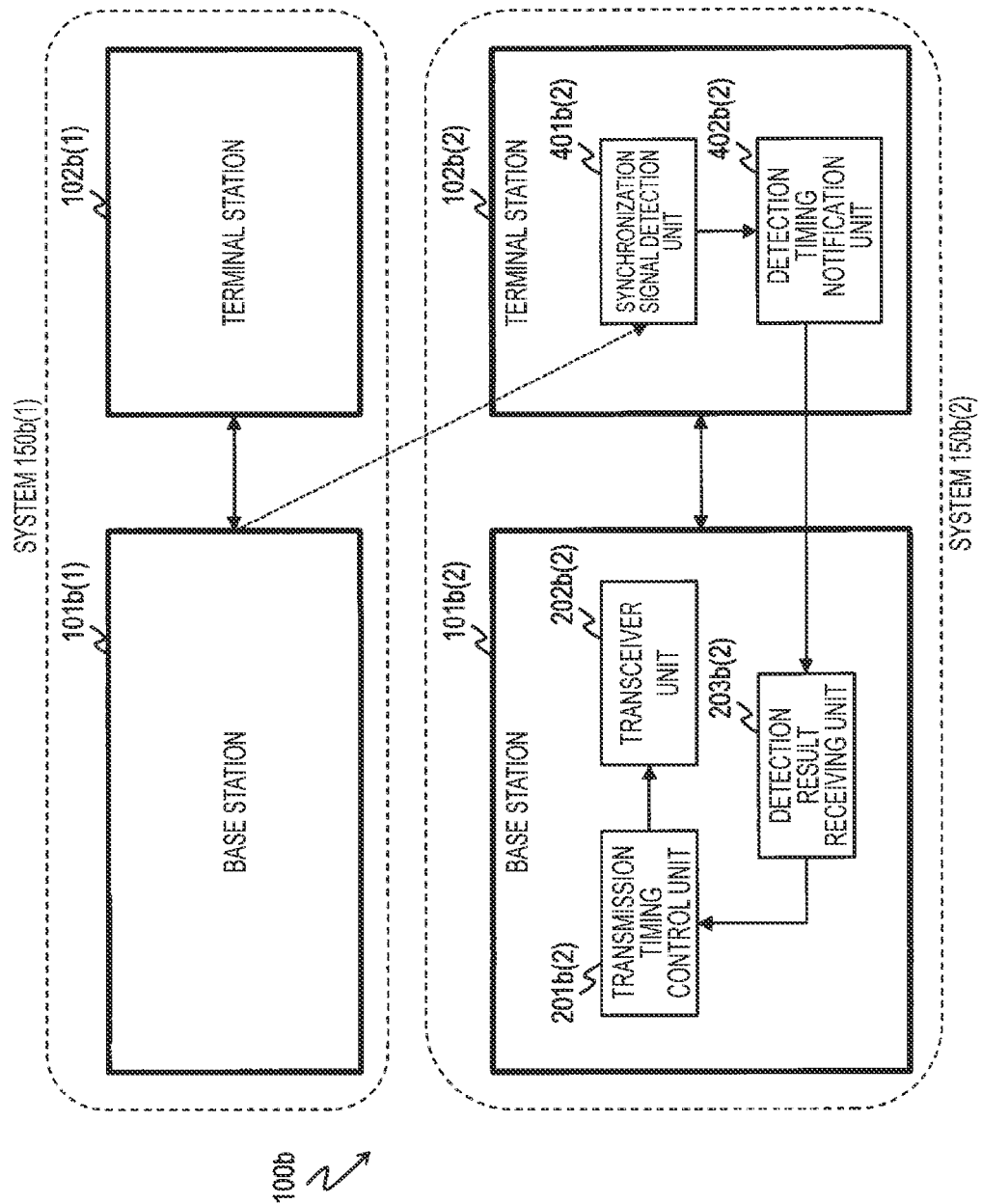
FIG. 5 is a diagram illustrating an example of a wireless communication system according to a third embodiment.

FIG. 5 is a diagram illustrating an example of a wireless communication system 100*b* according to a third embodiment. In FIG. 5, the wireless communication system 100*b* includes a base station 101*b*(1), a base station 101*b*(2), a terminal station 102*b*(1), and a terminal station 102*b*(2). The base station 101*b*(1) and the terminal station 102*b*(1) constitute a system 150*b*(1) as one set, and the base station 101*b*(2) and the terminal station 102*b*(2) constitute a system 150*b*(2) as another set using a wireless channel different from that of the system 150*b*(1), and each of the sets performs a communication using a time division duplex scheme. Note that, similarly to the first embodiment and the second embodiment, the wireless communication system 100*b* includes a plurality of sets, that is, the system 150*b*(1) and the system 150*b*(2), communications of the plurality of sets are operated simultaneously in adjacent areas, and the communications of the plurality of sets are subjected to interference with each other.

Here, difference from the wireless communication system 100 according to the first embodiment is that there is no management station 103. In the present embodiment, instead of the management station 103 controlling synchronization among the base stations 101, the base station 101*b*(2) and the terminal station 102*b*(2) of the system 150*b* control synchronization between the base station 101*b*(2) and the terminal station 102*b*(2) of the system 150*b* and the base station 101*b*(1) and the terminal station 102*b*(1) of the other system 150*b* using a different wireless channel. Note that, while in the first embodiment, both the base station 101 and the terminal station 102 are fixed stations installed on land and perform fixed land communications, the present embodiment is also applicable to a case where the communication distance between the base station 101 and the terminal station 102 which form a set is not fixed.

Furthermore, although the wireless communication system 100*b* according to the third embodiment has the same configuration of blocks as that of the wireless communication system 100*a* according to the second embodiment illustrated in FIG. 3, the method for controlling a transmission timing is different.

In FIG. 5, the terminal station 102*b*(2) includes a synchronization signal detection unit 401*b*(2) and a detection timing notification unit 402*b*(2).

Similarly to the synchronization signal detection unit 401*a*(2) of the second embodiment, the synchronization signal detection unit 401*b*(2) acquires a detection timing of a control slot of a downlink signal transmitted from the base station 101*b*(2) of the same system 150*b*(2) and a detection timing of a control slot of a downlink signal transmitted from the base station 101*b*(1) of the other system 150*b*(1) using a different wireless channel. Here, after receiving the control slot transmitted by the base station 101*b*(2) of the same system 150*b*(2) to be a communication partner, the synchronization signal detection unit 401*b*(2) scans a synchronization signal included in the control slot of the downlink signal transmitted by the other base station 101*b*(1) using a different wireless channel and when the synchronization signal is detected, outputs the detection as detection result information to the detection timing notification unit 402*b*(2).

The detection timing notification unit 402*b*(2) notifies the base station 101*b*(2) of the detection result information output from the synchronization signal detection unit 401*b* (2). Here, the detection result information may be information merely on whether or not the control slot of the base station 101*a*(1) using a different wireless channel is detected after the terminal station 102*b*(2) detects the control slot of the base station 101*a*(2).

In FIG. 5, the base station 101*b*(2) includes a transmission timing control unit 201*b*(2), a transceiver unit 202*b*(2), and a detection result receiving unit 203*b*(2). Note that, in FIG. 5, it is assumed that a communication is performed between the base station 101*b*(1) and the terminal station 102*b*(1) which constitute the system 150*b*(1) independently of a communication between the base station 101*b*(2) and the terminal station 102*b*(2) which constitute the system 150*b* (2). Furthermore, in FIG. 5, similarly to the cases of FIG. 1 and FIG. 3, a general processing block other than control of a timing at which the base station 101*b* transmits a downlink signal to the terminal station 102*b* (e.g., processing for connecting the terminal station 102*b* to a server on a network, and the like) is omitted.

The transmission timing control unit 201*b*(2) controls a timing at which a downlink signal is transmitted to the terminal station 102*b*(2) so that reception timings of downlink signals transmitted from the plurality of base stations, that is, the base station 101*b*(1) and the base station 101*b*(2), in the terminal station 102*b*(1) and the terminal station 102*b*(2) fall within a predetermined range determined in advance, and instructs the transceiver unit 202*b*(2) to transmit the downlink signal. Here, while in the first embodiment, the transmission timing at which the base station 101 of each set transmits a downlink signal to the corresponding terminal station 102 is controlled based on the communication distance between the base station 101 and the terminal station 102, in the present embodiment, similarly to the second embodiment, the transmission timing is controlled based on detection result information described later. In addition, while in the first embodiment, the transmission timing is given to each base station 101 by the management station 103, in the present embodiment, similarly to the second embodiment, the base station 101*b*(2) itself controls the transmission timing of the downlink signal. Note that the difference from the second embodiment is that the timing at which the downlink signal is transmitted to the terminal station 102*b*(2) is gradually adjusted so that the reception timings of the respective downlink signals in the terminal station 102*b*(1) and the terminal station 102*b*(2) fall within a predetermined range determined in advance.

Similarly to the transceiver unit 202 of the first embodiment and the transceiver unit 202*a* of the second embodiment, the transceiver unit 202*b*(2) performs a wireless communication with the terminal station 102*b*(2) using a preset wireless channel.

The detection result receiving unit 203*b*(2) receives, from the terminal station 102*b*(2), detection result information of the control slot of the other base station 101*b*(1) detected by the terminal station 102*b*(2) which forms a set together with the base station 101*b*(2). Here, as described above, the detection result information is information on whether or not the control slot of the base station 101*a*(1) using a different wireless channel is detected after the terminal station 102*b*(2) detects the control slot of the base station 101*a*(2).

Method for Controlling Transmission Timing in Third Embodiment

In the present embodiment, the transmission timing control unit 201*b*(2) controls the transmission timing based on the detection result information received from the terminal station 102*b*(2). For example, in a case where the detection result receiving unit 203*b*(2) receives, from the terminal station 102*b*(2), detection result information indicating that the terminal station 102*b*(2) has detected the control slot of the base station 101*b*(1) using a different wireless channel after detecting the control slot of the base station 101*b*(2), the transmission timing control unit 201*b*(2) delays the transmission timing of the downlink signal transmitted from the newly installed base station 101*b*(2) to the newly installed terminal station 102*b*(2) by one slot. Each time the detection result information is received, the transmission timing control unit 201*b*(2) repeatedly delays the transmission timing of the downlink signal transmitted from the newly installed base station 101*b*(2) to the newly installed terminal station 102*b*(2) by one slot. Note that, in a case where, after detecting the control slot of the base station 101*b*(2), detection result information indicating that the control slot of the base station 101*b*(1) using a different wireless channel has been detected is not received, the transmission timing is not adjusted and the previous transmission timing is kept.

In this manner, the transmission timing control unit 201*b*(2) can make the timing at which the terminal station 102*b*(1) receives the downlink signal from the base station 101*b*(1) and the timing at which the terminal station 102*b*(2) receives the downlink signal from the base station 101*b*(2) coincide with each other while gradually adjusting the timings in steps of one slot. Here, in the present embodiment, adjustment is made in one slot unit, and thus the timing at which the terminal station 102*b*(1) receives the downlink signal from the base station 101*b*(1) and the timing at which the terminal station 102*b*(2) receives the downlink signal from the base station 101*b*(2) are substantially the same timing with a shift of up to one slot. Note that the adjustment unit may be a unit smaller than one slot, and in this case, the shift in timing can be made smaller. Furthermore, in the present embodiment, the installation distance between the terminal station 102*b*(1) and the terminal station 102*b*(2) is sufficiently short compared to the distance between the base station 101*b*(1) and the base station 101*b*(2) and it is thus considered that the reception timing of the downlink signal of the base station 101*b*(1) detected by the terminal station 102*b*(2) is the same as the reception timing of the downlink signal of the base station 101*b*(1) in the terminal station 102*b*(1).

Here, in the present embodiment, it is assumed that the communication distance between the base station 101*b*(2) and the terminal station 102*b*(2) is shorter than the communication distance between the base station 101*b*(1) and the terminal station 102*b*(1).

Figure 6:
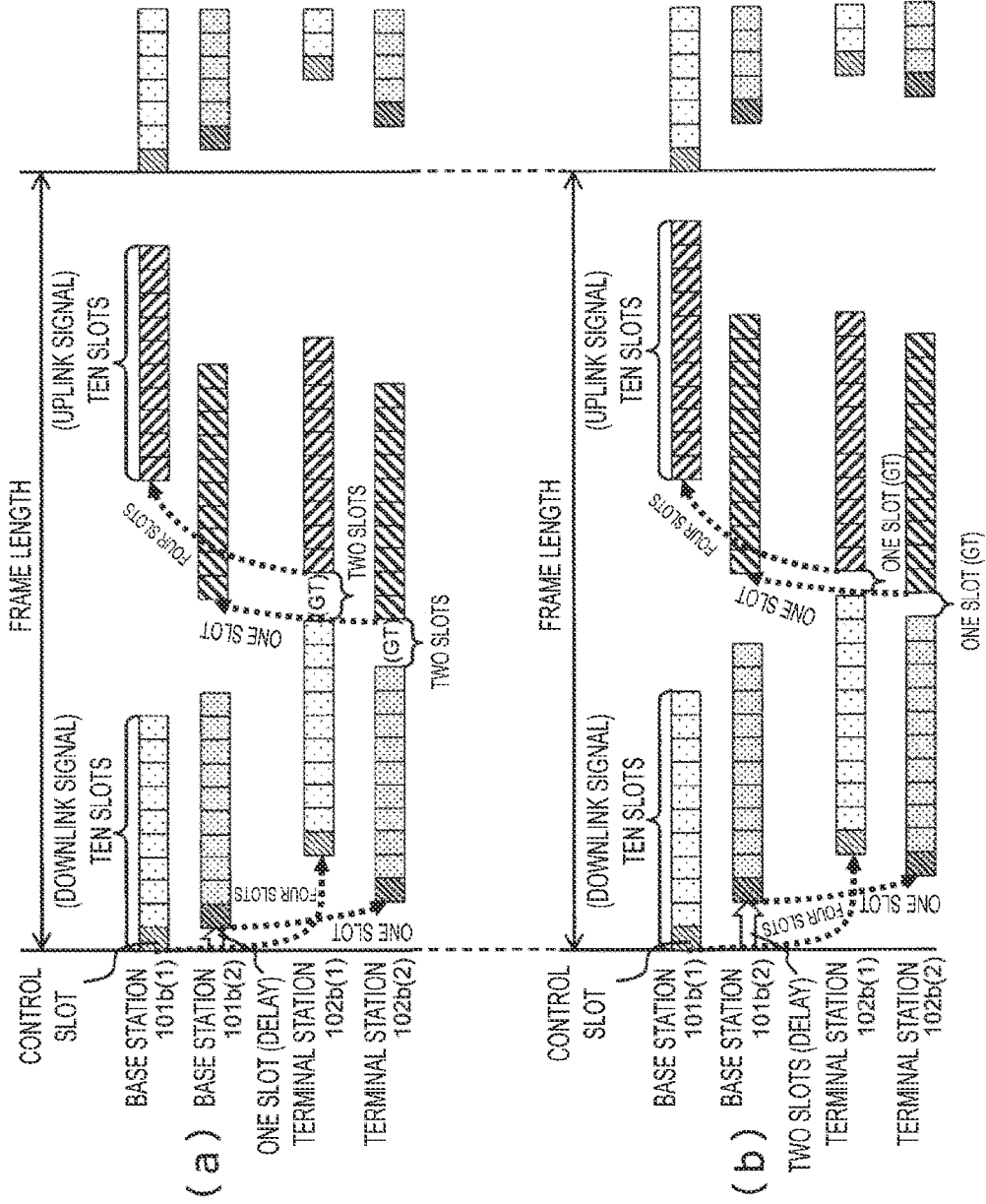
FIG. 6 is a diagram illustrating an example of timing adjustment in the wireless communication system according to the third embodiment.

FIG. 6 illustrates an example of timing adjustment of the wireless communication system 100*a* according to the third embodiment. Note that FIG. 6 is a diagram corresponding to FIG. 9 described in the related art, and illustrates an uplink signal and a downlink signal in a fixed frame length. Here, in FIG. 6, it is assumed that a relationship between a communication distance between the base station 101*b*(1) and the terminal station 102*b*(1) and a communication distance between the base station 101*b*(2) and the terminal station 102*b*(2) is the same as the relationship between the communication distance between the base station 801(1) and the terminal station 802(1) and the communication distance between the base station 801 (2) and the terminal station 802(2) in FIG. 8 described in the related art. The communication distance between the base station 101*b*(2) and the terminal station 102*b*(2) is thus shorter than the communication distance between the base station 101*b*(1) and the terminal station 102*b*(1). Due to this, for example, as illustrated in FIG. 9(*a*) of the related art, the downlink signal transmitted by the base station 101*b*(1) is received in the terminal station 102*b*(1) with a delay of 4 slots, and the downlink signal transmitted by the base station 101*b*(2) is received in the terminal station 102*b*(2) with a delay of one slot.

Here, in a case where the base station 101*b*(1), the base station 101*b*(2), the terminal station 102*b*(1), and the terminal station 102*b*(2) of the present embodiment are in the same state as the base station 801(1), the base station 801(2), the terminal station 802(1), and the terminal station 802(2) illustrated in FIG. 9(*a*) of the related art, the terminal station 102*b*(2) detects the control slot of the base station 101*b*(1) using a different wireless channel after detecting the control slot of the base station 101*b*(2), and thus the base station 101*b*(2) delays the transmission timing of the downlink signal transmitted to the terminal station 102*b*(2) by one slot.

As a result, as illustrated in FIG. 6(*a*), the timing at which the terminal station 102*b*(2) receives the downlink signal from the base station 101*b*(2) is delayed by one slot, thereby eliminating the problem in which the leading slot of the uplink signal transmitted by the terminal station 102*b*(2) to the base station 101*b*(2) overlaps with the trailing slot of the downlink signal transmitted from the base station 101*b*(1) to the terminal station 102*b*(1) as in FIG. 9(*a*) of the related art.

Furthermore, in the state of FIG. 6(*a*) as well, the terminal station 102*b*(2) detects the control slot of the base station 101*b*(1) using a different wireless channel after detecting the control slot of the base station 101*b*(2), and thus the base station 101*b*(2) further delays the downlink signal transmitted to the terminal station 102*b*(2) by one slot. As a result, as illustrated in FIG. 6(*b*), the timing at which the terminal station 102*b*(2) receives the downlink signal from the base station 101*b*(2) is delayed by a total of two slots, and thus even if the GT is reduced from two slots to one slot, the uplink signal transmitted by the terminal station 102*b*(2) to the base station 101*b*(2) and the downlink signal transmitted from the base station 101*b*(1) to the terminal station 102*b*(1) do not overlap with each other, whereby the number of slots that constitute the downlink signal and the uplink signal can be increased by one slot from 10 slots to 11 slots to be operated. This results in an effect of improving the frequency utilization efficiency of the wireless communication system 100*b*.

Processing Flow in Third Embodiment

Figure 7:
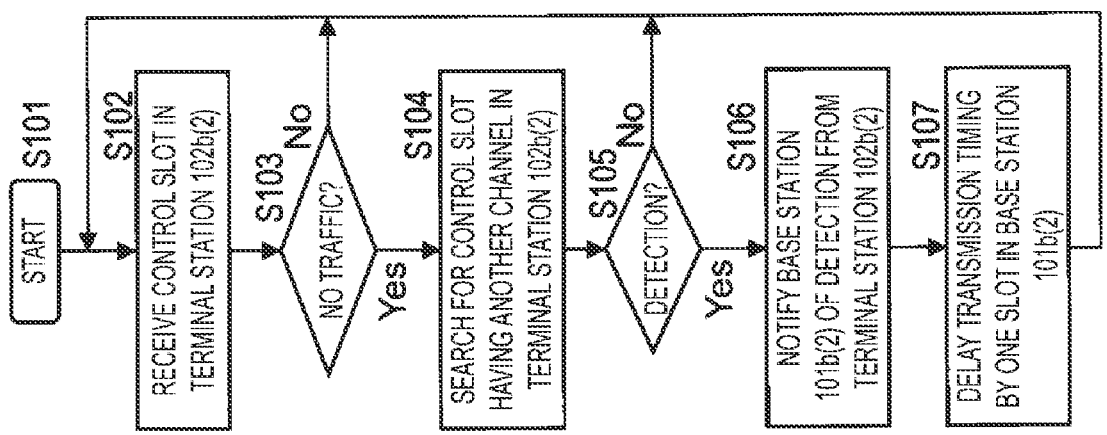
FIG. 7 is a diagram illustrating an example of processing of the wireless communication system according to the third embodiment.

FIG. 7 is a diagram illustrating an example of processing of the wireless communication system 100*b* according to the third embodiment. Note that each piece of the processing illustrated in FIG. 7 is executed by each of the blocks of the wireless communication system 100*b* illustrated in FIG. 5.

In step S101, the wireless communication system 100*b* starts processing of timing control.

In step S102, the terminal station 102*b*(2) receives a control slot transmitted from the base station 101*b*(2).

In step S103, the terminal station 102*b*(2) determines whether or not there is a traffic of the base station 101*b*(1), and in accordance with a determination that there is no traffic, the processing proceeds to step S104, and when there is a traffic, the processing returns to step S102.

In step S104, the terminal station 102*b*(2) searches for a control slot of the other base station 101*b*(1) using a different wireless channel.

In step S105, when the terminal station 102*b*(2) detects the control slot of the other base station 101*b*(1) using a different wireless channel, the processing proceeds to step S106, and when the control slot of the base station 101*b*(1) is not detected, the processing returns to step S102.

In step S106, the terminal station 102*b*(2) notifies the base station 101*b*(2) of the same system 150*b*(2) that the control slot of the other base station 101*b*(1) using a different wireless channel is detected.

In step S107, the base station 101*b*(2) delays the transmission timing of the downlink signal transmitted to the terminal station 102*b*(2) by one slot, and the processing returns to step S102 to repeatedly perform the same processing.

In this way, in the wireless communication system 100*b* according to the present embodiment, when the downlink signal transmitted from the base station 101*b*(2) is delayed in steps of one slot, it is possible to reduce a shift between the reception timing of the downlink signal transmitted by the base station 101*b*(1) to the terminal station 102*b*(1) in the terminal station 102*b*(1) and the reception timing of the downlink signal transmitted by the base station 101*b*(2) to the terminal station 102*b*(2) in the terminal station 102*b*(2) to up to one slot (approximately the same).

As described in the embodiments, the wireless communication system, the wireless communication method, the management station device, the base station device, and the terminal station device according to the present invention can, without generating inter-channel interference between terminal stations each performing a communication using a time division duplex scheme, shorten a guard time from the reception end of the downlink signal to the transmission start of the uplink signal in each terminal station to improve the frequency utilization efficiency.

REFERENCE SIGNS LIST 100, 100*a*, 100*b*, 700 Wireless communication system
101, 101*a*, 101*b*, 801 Base station
102, 102*a*, 102*b*, 802 Terminal station
103 Management station
150, 150*a*, 150*b*, 750 System
201, 201*a*, 201*b* Transmission timing control unit
202, 202*a*, 202*b* Transceiver unit
203, 203*a*, 203*b* Detection result receiving unit
301 Base station transmission timing control unit
302 Communication distance management unit
401*a*, 401*b* Synchronization signal detection unit
402*a*, 402*b* Detection timing notification unit

The invention claimed is:

1. A wireless communication system, comprising
a plurality of sets of base station devices and terminal station devices configured to perform communications in an equal frame length using a time division duplex scheme, the communications of the plurality of sets being operated simultaneously in adjacent areas, wherein
each of the base station devices includes
a control unit configured to control a transmission timing of a downlink signal transmitted from the base station device itself based on a communication distance between the base station device and the terminal station device of each of the sets or a reception timing of a downlink signal in the terminal station device such that reception timings of downlink signals transmitted from the base station device itself and other base station devices in the terminal station devices of the sets fall within a predetermined range determined in advance.

2. A wireless communication method in which a plurality of sets of base station devices and terminal station devices configured to perform communication in an equal frame length using a time division duplex scheme are present and communications of the plurality of sets are operated simultaneously in adjacent areas, the wireless communication method comprising
controlling a transmission timing of a downlink signal transmitted from each of the base station devices based on a communication distance between the base station device and the terminal station device of each of the sets or a reception timing of a downlink signal in the terminal station device, such that reception timings of downlink signals transmitted from the base station devices in the terminal station devices of the sets fall within a predetermined range determined in advance.

3. A management station device configured to control a transmission timing of a downlink signal to be transmitted by a base station device to a terminal station device in a wireless communication system in which a plurality of sets of base station devices and terminal station devices configured to perform communications in an equal frame length using a time division duplex scheme are present and communications of the plurality of sets are simultaneously operated in adjacent areas, the management station device comprising:
- a management unit configured to store information on communication distances between the base station devices and the terminal station devices of the sets; and
- a control unit configured to control a transmission timing of a downlink signal transmitted from each of the base station devices based on each of the communication distances between the base station devices and the terminal station devices of the sets, such that reception timings of downlink signals transmitted from the base station devices in the terminal station devices of the sets fall within a predetermined range determined in advance.

* * * * *